Patented Mar. 6, 1934

1,950,067

UNITED STATES PATENT OFFICE 1,950,067

SALTS OF DIPHENYLGUANIDINE AND PROCESS OF MAKING SAME

Robert L. Sibley, Nitro, W. Va., assignor to The Rubber Service Laboratories Company, Akron, Ohio, a corporation of Ohio No Drawing. Application April 17, 1931,
Serial No. 531,008

13 Claims. (Cl. 260—108)

The present invention relates to a new class of compounds comprising salts of diphenylguanidine and an organic acid whose dissociation constant in water is less than $1.0 \times 10^{-2}$, and which contains less than fourteen carbon atoms. The preferred class of compounds possess valuable regulating or retarding properties when employed in the rubber vulcanization process. The invention also comprises the process of manufacturing such products.

One of the preferred class of compounds, for example, di-(diphenyl guanidine) phthalate, was prepared by dissolving substantially one molecular proportion of phthalic acid, whose dissociation constant in water is approximately $1.2 \times 10^{-3}$, and substantially two molecular proportions of diphenylguanidine in a convenient quantity of an organic solvent, for example, ethyl alcohol, and isolating the product by any convenient means, as for example by evaporating the solution to dryness at approximately 100° C. The product obtained is a white, crystalline solid, whose melting point is 183–185° C. This compound, namely, di-(diphenyl guanidine) phthalate, was, however, prepared preferably by the following method: Substantially two molecular proportions of diphenylguanidine hydrochloride, preferably in the form of an approximately 31 per cent aqueous solution, and substantially one molecular proportion of sodium phthalate, preferably in the form of an approximately 13 per cent aqueous solution, were added concurrently and at substantially the same rate to a "heel" of water, which was rapidly agitated. The product was precipitated as white granular crystals, which were preferably washed with water. By the term "heel" as appearing in the present specification is meant a quantity of water previously added to the reactor in such proportion that the reactants on addition thereto can be efficiently agitated during the entire reaction.

Another of the preferred class of compounds, for example, diphenylguanidine benzoate, was prepared by dissolving substantially one molecular proportion of benzoic acid, whose dissociation constant in water is approximately $6.6 \times 10^{-5}$, and substantially one molecular proportion of diphenylguanidine in a convenient quantity of an organic solvent, for example, ethyl alcohol, and isolating the product by any convenient means, as for example by evaporating the solution to dryness at approximately 100° C. The product obtained is a white, crystalline solid, whose melting point is 145.5 to 150° C.

Another of the preferred class of compounds, for example, diphenylguanidine acetate, was prepared by adding substantially one molecular proportion of diphenylguanidine to substantially one molecular proportion of acetic acid, whose dissociation constant in water is approximately $1.9 \times 10^{-5}$, the acid being preferably in the form of substantially 50 to 70 per cent acid, heating until solution took place, and cooling. The whole mixture set into a crystalline mass at room temperature. The product was ground and then dried at room temperature. The melting point of this product when containing water of crystallization is 89–92° C., and when containing no water of crystallization is 125–127° C. This compound, namely diphenylguanidine acetate, has also been prepared by reacting diphenylguanidine with acetic acid of approximately 17 per cent, 30 per cent, 76 per cent and 100 per cent strengths. Diphenylguanidine acetate has also been prepared by running aqueous solutions of approximately equal molecular proportions of sodium acetate and of diphenylguanidine hydrochloride concurrently into a "heel" of water while agitating rapidly. The product precipitated out and was then removed preferably by filtration.

Other salts of diphenylguanidine of the type hereinbefore disclosed, for example, diphenylguanidine butyrate, diphenylguanidine citrate, diphenylguanidine tartrate, diphenylguanidine salicylate, and the like, may be prepared by methods analogous to those described above, as further examples of the preferred class of compounds.

What is claimed is:

1. As new compounds the salts of diphenylguanidine and an organic carboxylic acid whose dissociation constant in water is less than $1.0 \times 10^{-2}$ and which contains less than fourteen carbon atoms.

2. As new compounds the salts of diphenylguanidine and an aromatic carboxylic acid.

3. As new compounds the salts of diphenylguanidine and an organic acid in which the carboxyl group is attached to a benzene nucleus.

4. As new compounds the salts of diphenylguanidine and a dibasic aromatic acid.

5. As a new compound di-(diphenyl guanidine) phthalate.

6. As a new compound diphenylguanidine acetate.

7. The process of preparing a salt of diphenylguanidine and an organic carboxylic acid whose dissociation constant in water is less than $1.0 \times 10^{-2}$, and which contains less than fourteen carbon atoms, which comprises treating an alkali metal salt of said organic acid with an inorganic acid salt of said diphenylguanidine.

8. The process of preparing a salt of diphenylguanidine and an aromatic acid which comprises treating an inorganic acid salt of diphenylguanidine with an alkali metal salt of an aromatic carboxylic acid.

9. The process of preparing a salt of diphenylguanidine and an organic acid in which the carboxyl group is attached to a benzene nucleus, which comprises treating an alkali metal salt of said acid with an inorganic acid salt of diphenylguanidine.

10. The process of preparing a salt of diphenylguanidine and a dibasic aromatic acid, which comprises treating an alkali metal salt of said acid with an inorganic acid salt of diphenylguanidine.

11. The process of preparing diphenylguanidine phthalate, which comprises treating diphenylguanidine hydrochloride with sodium phthalate.

12. The process of preparing diphenylguanidine acetate, which comprises treating an inorganic acid salt of diphenylguanidine with an alkali metal salt of acetic acid.

13. The process of preparing diphenylguanidine phthalate, which comprises adding an aqueous solution of substantially two molecular proportions of diphenylguanidine hydrochloride and an aqueous solution of substantially one molecular proportion of sodium phthalate concurrently and at a regulated rate to a "heel" of water.

ROBERT L. SIBLEY.